3,010,936
BLEND OF GRAFT COPOLYMER OF POLYBUTADIENE, STYRENE AND ACRYLONITRILE WITH INTERPOLYMER OF ALPHA METHYL STYRENE AND ACRYLONITRILE
Howard H. Irvin, Gary, Ind., assignor to Borg-Warner Corporation, Chicago, Ill., a corporation of Illinois
No Drawing. Filed Aug. 7, 1958, Ser. No. 753,643
6 Claims. (Cl. 260—45.5)

This invention relates to polymer blends exhibiting a desirable combination of physical properties. More particularly, this invention relates to polymer blends of high impact value and exhibiting a desirable combination of physical properties. In one specific aspect thereof, this invention relates to polymer blends of high impact value, high tensile strength and high hardness and further characterized by a high heat distortion point.

Many synthetic polymers exhibit a high degree of environmental stability. Thus, many synthetic polymers are chemically inert exhibiting, for example, excellent resistance to most salts, acids, alkalies, alcohols, aliphatic hydrocarbons, etc., and excellent resistance to degradation by oxygen, ozone and ultra violet light. These outstanding properties immediately suggest the employment of these polymers in the fabrication of various structural shapes such as rigid sheets and moldings, pipe, valves, fittings, and similar objects.

However, synthetic polymers exhibiting a high degree of environmental stability are, practically without exception, decidedly lacking in certain other characteristics, desirable or even necessary if these materials are to be employed in the fabrication of structural shapes exhibiting satisfactory environmental stability characteristics combined with desirable physical properties.

Thus, such synthetic polymers are frequently of low impact value. The conformation of rigid shaped articles that may be satisfactorily fabricated from polymers of low impact value is rather severely restricted. Thus, the design of such objects should avoid sharp directional transitions and preferably such operations as threading, drilling or tapping should not be required in the fabrication of the objects. Also, if the material of construction is characterized by a low impact value, the permissible methods and fields of utilization of rigid shaped articles made therefrom are seriously circumscribed. Thus, force fitting and overstressed conditions must be avoided in the assembly of rigid shaped articles made from synthetic polymers of low impact value and the final assembly must not be subjected to vibration, shock, or impact loads during use.

Also, more frequently than not, synthetic polymers exhibiting a high degree of environmental stability are more or less deficient in tensile strength. Obviously, a low tensile strength seriously circumscribes the permissible fields of application of rigid shaped articles made from such low tensile materials. Such articles are preferably not used in situations where they are subjected to internal pressures during use, such as frequently occurs in situations involving pipe, valves, fittings and the like.

Finally, synthetic polymers exhibiting a high degree of environmental stability are frequently characterized by a rather low heat distortion point. Rigid shaped articles made from synthetic polymers having a low heat distortion point are obviously characterized by a more or less deficient dimensional stability, particularly at somewhat elevated temperatures, resulting in a much narrower permissible range of temperature for the employment of the shaped articles than may be desirable. The situation is particularly bad when an attempt is made to use a rigid shaped article of low tensile strength and low heat distortion point in a system operating at elevated temperatures and pressures, e.g., a system involving passage of a fluid at elevated temperature and pressure through a pipe.

I have found that blending two specific synthetic polymers results in the formation of a material characterized by a high impact value, a high tensile strength, a high hardness and a high heat distortion point. In addition, the blends of this invention exhibit a high environmental stability. The blends of this invention are particularly adapted for use in the fabrication of various structural shapes such as rigid sheets and moldings, pipe, valves, fittings, and similar objects.

One object of this invention is to provide a blend of synthetic polymers exhibiting a high impact value.

Another object of this invention is to provide a high impact value blend of synthetic polymers exhibiting a high tensile strength.

An additional object of this invention is to provide a high impact value blend of synthetic polymers exhibiting a high heat distortion point.

A further object of this invention is to provide a high impact value blend of synthetic polymers exhibiting a high tensile strength and high heat distortion point.

Other objects of this invention will become apparent as the description thereof proceeds.

Within recent years it has become increasingly common practice to prepare polymeric products by the so-called "graft" copolymerization technique. As may be determined by reference to the Report of Nomenclature of the International Union of Pure and Applied Chemistry (published in the Journal of Polymer Science, volume 8, page 260, 1952), the term "graft copolymerization" is employed to designate the process wherein a polymerizable monomer (or mixture of polymerizable monomers) is reacted, under polymerizing conditions, in the presence of a previously formed polymer or copolymer. "A graft copolymer is a high polymer, the molecules of which consist of two or more polymeric parts, of different composition, chemically united together. A graft copolymer may be produced, for example, by polymerization of a given kind of monomer with subsequent polymerization of another kind of monomer onto the product of the first polymerization."

Also, it is now common practice to prepare copolymers by the polymerization of a mixture containing a major proportion of alpha methyl styrene and a minor proportion of vinyl cyanide.

I have found that blends of certain graft copolymers (of a nature described specifically and in detail subsequently) with certain copolymers (of a nature described generally in the previous paragraph and described specifically and in detail subsequently) are characterized by a high impact value, a high hardness, a high heat distortion point and a high tensile strength.

Graft copolymers suitable for use in the production of the blends of this invention may be prepared by the interaction, under polymerizing conditions, of a mixture of vinyl cyanide and a vinyl aromatic hydrocarbon exemplified by styrene, with a conjugated diolefine polymer latex, exemplified by polybutadiene latex. The organic portion of the reaction mixture comprises about 40–80% by weight combined acrylonitrile plus styrene and about 60 to 20% by weight (dry basis) polybutadiene. The acrylonitrile preferably comprises from 10–30% by weight of the three component organic mixture (acrylonitrile plus styrene plus polybutadiene), the styrene 30–70% by weight and the polybutadiene, correspondingly, 20–60% by weight of the three component organic mixture.

The other type of synthetic polymers employed in the production of the blends of this invention is prepared by the copolymerization of vinyl cyanide and alpha methyl styrene. Particularly suitable synthetic polymer blending components of this nature are obtained if the alpha methyl styrene contains a minor quantity of styrene. The acrylonitrile preferably comprises from about 20–30% by weight of the total mixture employed in forming the blending resin. The alpha methyl styrene comprises, correspondingly, from 80 to 70% by weight of the reaction mixture and, as mentioned previously, may consist of alpha methyl styrene exclusively or advantageously may be a mixture of alpha methyl styrene and styrene in a ratio ranging from about 50:50 to say 90:10 or higher.

For the better understanding of this invention the following specific embodiments and details thereof are given but it is to be understood that the embodiments and details set forth below are illustrative only and the spirit and scope of the invention is in no way limited to such specific embodiments and details thereof.

For the better understanding of this invention, the following example sets forth a description of the preparation of two representative graft copolymers suitable for use in forming the new and improved blends of this invention. It will be noted that the styrene/acrylonitrile ratio is approximately the same (about 1.8 by weight) in both resin X and resin Y. However, the sum of acrylonitrile plus styrene is 80% by weight (of acrylonitrile plus styrene plus polybutadiene) in resin X and only 70% in resin Y.

While the proportions of the three major reacting components differed in the respective recipes for resin X and resin Y, the remainder of the two polymerization recipes was the same, both with respect to nature and amount of the remaining components thereof, as was the polymerization procedure and method of polymer recovery. Accordingly, such information will be set forth but once in the following example.

*Example 1*

The following recipes (set forth in parts by weight) were employed:

| Polymer resin designation | Y | X |
|---|---|---|
| Polybutadiene latex, polybutadiene equivalent | 30.9 | 20.0 |
| Acrylonitrile | 25.0 | 29.0 |
| Styrene | 45.0 | 51.0 |
| Total | 100.0 | 100.0 |
| Cumene hydroperoxide | 0.75 | |
| Sodium salt of hydrogenated disproportionated rosin | 2.0 | |
| Sodium pyrophosphate | 0.5 | |
| Sodium hydroxide | 0.15 | |
| Sodium salt of condensed alkyl naphthalene sulfonic acid | 0.15 | |
| Dextrose | 1.0 | |
| Ferrous sulfate | 0.10 | |
| Water, including water present in the polybutadiene latex | 160.0 | |

The above recipes were separately introduced into individual glass reactors which were sealed and tumbled for six hours in a water bath heated to 65–85° C. At the end of this time, reaction was essentially complete. The polymeric products formed were individually and separately recovered as follows: The selected final reaction mixture was coagulated with dilute brine and sulfuric acid, heated to 95° C. to produce partial granulation of the coagulated product to facilitate subsequent filtration and washing operations, filtered, washed and finally dried to constant weight at 110° C.

Certain physical properties of the graft copolymers prepared as above described are tabulated below:

| Polymer resin designation | Y | X |
|---|---|---|
| Notched Izod Impact Value, ⅛ in. bar; Ft. Lbs./Inch of notch (A.S.T.M. Method D–256) | 6.7 | 3.5 |
| Rockwell Hardness, R Scale (A.S.T.M. Method D–785) | 88 | 100 |
| Tensile Strength, Lbs./Sq. in. (A.S.T.M. Method D–636) | 4,600 | 5,645 |
| Elongation, percent | 70 | 20 |
| Melt Index, A1 (Note A) | 1.4 | 2.2 |
| Heat Distortion Point, ° C. (Note B) | 98 | 98 |

NOTE A.—A modification of the procedure set forth in A.S.T.M. Method D–1238–52T. This procedure was originally developed for determining the melt index of polyethylene. Broadly and briefly, in this method, the weight in grams of polyethylene that is discharged during a period of three minutes through a standard orifice positioned below a reservoir of the polymer that is at a standard temperature and under a standard pressure is determined. This determination is proportioned to give the grams of polymer discharged during ten minutes which figure is, by definition, the melt index of polyethylene.

Since the thermoplasticity of the blends with which this invention is concerned is not even of the same order of magnitude as that of polyethylene, a considerable modification of the standard conditions and dimensions set forth in A.S.T.M. Method D–1238 had to be made in order to make this general method applicable to the blends with which this invention is concerned. These modifications involved changes in the size of the orifice, the pressure applied to the blend in the reservoir, the reservoir temperature and the like.

As used herein, melt indices designated A1 express the weight in grams of polymer or polymer blend discharged in one minute through an orifice 0.125 inch in diameter and 0.315 inch long from a reservoir 0.373 inch in diameter containing polymer or polymer blend maintained at a temperature of 410° F. and under a pressure produced by a 5664 g. load. Thus, an A1 melt index of 1.4 means that 1.4 g. of polymer were discharged through the orifice in one minute under the conditions named.

NOTE B.—A compression molded bar one inch wide, four inches long and 0.041 to 0.045 inch thick is employed as a test specimen in determination of heat distortion point. The test bar is carefully centered upon and forms a bridge between two supports, the knife edges of these supports being separated by a distance of exactly 3.75 inches. It is seen that the molded test bar extends beyond each of the supports for a distance of 0.125 inch. A 30 g. weight is placed on the exact center of the so supported test bar. The resulting assembly is located in an air oven and heat (electrically generated) is applied at the rate necessary to secure a temperature rise of the air of 1° C. per minute. The temperature at which the bar falls from the supports is the heat distortion point of the polymer blend.

*Example 2*

Copolymers of alpha methyl styrene and acrylonitrile and terpolymers of alpha methyl styrene, styrene and acrylonitrile, suitable for use as one of the components of the blends of the present invention, may be prepared in accordance with the following recipes (set forth in parts by weight) and operating procedures.

While the ratios of alpha methyl styrene, styrene, and acrylonitrile differ in the various recipes, the remaining components thereof are the same in all recipes both with respect to identity and amount. Accordingly, information on these remaining components is presented but once in the following table. Also, as a matter of interest, the table gives the heat distortion point of the various polymers formed.

| Polymer resin designation | A | B | C | D | E | F |
|---|---|---|---|---|---|---|
| Alpha methyl styrene | 70 | 62.5 | 60 | 50 | 50 | 40 |
| Styrene | 0 | 7.5 | 10 | 20 | 30 | 40 |
| Acrylonitrile | 30 | 30 | 30 | 30 | 20 | 20 |
| Heat distortion point, ° C. (Note B) | 109 | ------ | 118.5 | 100 | 97.5 | 92.5 |
| Potassium persulfate [1] | | | 0.25 | | | |
| Sodium hydroxide | | | 0.1 | | | |
| Dresinate 731 (Note C) | | | 2.0 | | | |
| Water | | | 100.0 | | | |

[1] See further remarks under following description of the operating procedure.
NOTE B.—See Example 1.
NOTE C.—Dresinate 731 is the sodium salt of hydrogenated, disproportionated rosin.

The preparative procedure followed in the production of terpolymer resin B will be described as exemplifying the procedure followed in the preparation of all copolymer and terpolymer resin blending components of this invention.

The organic reactants (alpha methyl styrene, styrene and acrylonitrile) were emulsified in the water which contained the small amount of sodium hydroxide and the Dresinate 731 rosin soap type emulsifier. The potassium persulfate catalyst was then added, the reaction vessel was sealed and entered into a water bath heated to 80–85° C. The reaction vessel was tumbled in the water bath at the temperature given until reaction was about 90% complete at which time the vessel was removed from the water bath, opened, and an additional 0.125 part by weight potassium persulfate catalyst were added. The reaction vessel was resealed and reentered into the water bath (heated to the temperature previously given) and tumbling of the reactor therein was continued until the polymerization reaction was essentially complete. In the preparation of the terpolymer resins of this example, the total reaction time was five hours. In the preparation of resin B, the yield of terpolymer was 98.0% of theory.

In many instances the polymer latex formed as the result of these operations may be employed in the subsequent blending step. However, if it is desired to recover the polymer formed, the polymer latex produced is coagulated by treatment with a solution of an electrolyte such as dilute brine or dilute sulfuric acid. The resulting coagulated mixture is preferably heated to about 95° C. to bring about partial granulation of the coagulum, thus facilitating subsequent filtering and washing operations. The coagulum is separated by filtration, is washed with water and then dried to constant weight at 110° C.

It will be noted that with a single exception (resin A) all recipes of this example include more or less styrene in addition to alpha methyl styrene. In contrast to alpha methyl styrene, the emulsion polymerization of styrene proceeds at a rapid rate. In addition, the presence of a small amount of styrene greatly accelerates the rate of emulsion polymerization of alpha methyl styrene. Accordingly, it is advantageous to employ a styrene-alpha methyl styrene mixture in order to accelerate the emulsion polymerization reaction. However, and confining attention to the binary styrene-alpha methyl styrene mixture, preferably this contains not more than about 7 to 15% styrene. If a greater amount of styrene is present, the rate of emulsion polymerization is not greater than that observed when 7–15% styrene is present but, as may be seen from the data of the table of this example, the heat distortion point of the resulting terpolymers decreases as the proportion of styrene in the recipe increases. Accordingly, the maximum polymerization rate and the maximum heat distortion point of the terpolymer product is obtained when styrene represents not more than about 7 to 15% of the styrene-alpha methyl styrene mixture, corresponding to not more than about 5 to 10% of the styrene-alpha methyl styrene-acrylonitrile mixture.

A graft copolymer resin of the general nature set forth in Example 1 hereof is blended with a copolymer or terpolymer resin of the general nature set forth in Example 2 hereof to form a composition of this invention. Conventional procedures of the prior art may be employed to produce the blends of this invention. Thus, the two resin blending components may be worked on a heated mill until fluxing occurs following which the resulting mix is worked for a few additional minutes to assure that a uniform blend is produced. However, since each of the resin blending components is originally produced in the form of a polymer latex, an extremely uniform blend is readily prepared by mixing appropriate volumes of the two latices and then coagulating the resulting mixture and separating the resulting coagulum by methods previously described briefly herein.

A large number of blends of the copolymers and terpolymers described in Example 2 hereof with graft copolymers described in Example 1 hereof have been prepared and the physical properties of the resulting blends determined, the results obtained with typical blends of this invention being set forth in the several examples to follow.

In general, the hardness of the blends of this invention increases as a straight line function of the content of the copolymer or terpolymer, described in Example 2 hereof, in the blend.

The tensile strength of the blends of this invention exhibits a variation with composition rather similar to that previously set forth with respect to hardness but the increase in tensile strength is somewhat more rapid than a straight line function of the content of copolymer or terpolymer in the blend.

The variation in heat distortion point of the blends of this invention versus the composition thereof is quite different from the analogous data just described in connection with hardness and tensile strength. The heat distortion point of blends prepared in accordance with this invention is comparatively low and quite constant when the blends contain from 10% to about 20–25% of the copolymer or terpolymer of Example 2 hereof and is comparatively high and constant when the blends contain 35–40% or more of such a copolymer or terpolymer.

The above variations make possible the production of blends of differing compositions depending upon the proposed end use of shaped objects fabricated therefrom. Thus, in the production of plastic pipe designed to carry a heated fluid a blend containing around 40% or more of the copolymer or terpolymer of Example 2 hereof would be employed since the resulting structure would not only possess a high hardness and high tensile strength but, in addition, would have the high heat distortion point necessary for maintenance of dimensional stability in the presence of the hot fluid. If, on the other hand, it is only necessary that the plastic pipe carry a cold fluid then a blend containing only about 20% or even less of a copolymer or terpolymer of Example 2 hereof will give eminently satisfactory service.

*Example 3*

The following table presents data on the compositions and physical properties of blends made in accordance with this invention and containing 30% or less of a terpolymer of Example 2 hereof.

In preparing the blends set forth in the present example, graft copolymer resin Y of Example 1 and terpolymer resin B of Example 2 were employed.

In order to facilitate comparisons the following table also presents data on the physical properties of graft copolymer resin Y.

| Blend designation | | 1 | 2 | 3 |
|---|---|---|---|---|
| Parts by weight resin Y | 100 | 90 | 80 | 70 |
| Parts by weight resin B | 0 | 10 | 20 | 30 |
| Notched Izod Impact Value, ⅛ in. bar; Ft.lb./in. notch (A.S.T.M. Method D–256) | 6.7 | 6.5 | 6.8 | 5.5 |
| Rockwell Hardness, R Scale (A.S.T.M. Method D–785) | 88 | 92 | 97 | |
| Tensile Strength Lbs./Sq.in. (A.S.T.M. Method D–636) | 4,600 | 4,875 | 5,450 | 5,630 |
| Elongation, percent | 70 | 60 | 50 | 60 |
| Melt Index, A1 (Note A) | 1.4 | 1.0 | 0.8 | 0.8 |
| Heat Distortion Point, ° C. (Note B) | 98 | 103 | 104 | 108 |

NOTES A and B.—See Example 1.

The data of the above table show that as far as hardness and tensile strength are concerned, these physical characteristics increase more or less uniformly as the terpolymer resin content of the compositions increases from 0 to 30%. Heat distortion points exhibit a quite different behavior. The heat distortion point is constant and rather low (103–104° C.) when the compositions contain from 10 to 20% terpolymer resin but exhibits a pronounced increase (to 108° C.) when the content of this terpolymer resin in the blend is 30%.

Example 4

As mentioned previously, blends of this invention containing from about 35–40% or more of the copolymer or terpolymer have a high and constant heat distortion point in addition to high tensile strength and high hardness characteristics. Such blends are obviously of high commercial utility.

The following table presents data on the physical properties of a number of blends containing 40 parts by weight terpolymer resin B (Example 2) and 60 parts by weight graft copolymer resin Y (Example 1). To facilitate comparisons, the table also presents data on the physical properties of graft copolymer resin Y. A sample of resin B produced on the laboratory scale was employed to form blend No. 4 while resin B from pilot plant runs and resin Y from commercial production were used in making blends Nos. 5 and 6.

| Blend designation | | 4 | 5 | 6 | 7 | 8 |
|---|---|---|---|---|---|---|
| Parts by weight resin Y | 100 | 60 | 60 | 60 | 60 | 60 |
| Parts by weight resin B | 0 | 40 | 40 | 40 | 40 | 40 |
| Notched Izod Impact Value, ⅛ in. bar; Ft.lb./in. notch (A.S.T.M. Method D-256) | 6.7 | 4.3 | 5.0 | 5.1 | 4.5 | 4.5 |
| Rockwell Hardness, R Scale (A.S.T.M. Method D-785) | 88 | 104 | 103 | 108.5 | 104 | 104 |
| Tensile Strength, Lbs./Sq.In. (A.S.T.M. Method D-636) | 4,600 | 6,100 | 6,080 | | 6,090 | 6,090 |
| Elongation, percent | 70 | 40 | 20 | | 40 | 40 |
| Melt Index A1 (Note A) | 1.4 | | | | 0.2 | |
| Melt Index A3 (Note D) | | 2.7 | 0.2 | 0.5 | | 0.6 |
| Heat Distortion Point, °C. (Note B) | 98 | 111.5 | 109 | | 109 | 109 |

Notes A and B.—See Example 1.
Note D.—Here the melt index is given by the grams of blend extruded in three minutes. As would be expected, A3 melt indices are approximately three times as large as the A1 melt indices of identical samples.

The 60:40 blends of this example have an average R scale hardness just under 105 which forms a point on the straight line composition versus hardness plot covering blends containing from 0% to 50% resin B. The average tensile strength of the blends is 6090 pounds per square inch.

The average heat distortion point of the four blends upon which such data are available is 109.6° C. This is very much above the 103–104° C. heat distortion point value exhibited by blends containing from 10% to 20% resin B and noticeably above the 108° C. heat distortion point of the 70:30 resin Y-resin B blend.

Example 5

The following table gives the physical characteristics of 50:50 resin Y-resin B blends, the physical properties of a straight resin Y also being included to facilitate comparisons. Resin B produced on the pilot plant scale and commercial resin Y were used in producing resin blends Nos. 11, 12 and 13, while commercial resin B and commercial resin Y were used in forming blend No. 14.

| Blend designation | | 10 | 11 | 12 | 13 | 14 |
|---|---|---|---|---|---|---|
| Parts by weight resin Y | 100 | 50 | 50 | 50 | 50 | 50 |
| Parts by weight resin B | 0 | 50 | 50 | 50 | 50 | 50 |
| Notched Izod Impact Value, ⅛ in. bar; Ft.lbs./in. notch (A.S.T.M. Method D-256) | 6.7 | 4.8 | 5.0 | 4.3 | 3.8 | 3.1 |
| Rockwell Hardness, R Scale (A.S.T.M. Method D-785) | 88 | 108 | 108 | | 110 | 110 |
| Tensile Strength, Lbs./Sq.in. (A.S.T.M. Method D-636) | 4,600 | 6,975 | 6,980 | 6,910 | 7,175 | 6,760 |
| Elongation, percent | 70 | 20 | 40 | 20 | 30 | 35 |
| Melt Index A1 (Note A) | 1.4 | 0.1 | | | | |
| Melt Index A3 (Note D) | | | 0.3 | | 0.3 | 0.2 |
| Heat Distortion Point, °C. (Note B) | 98 | 109 | 107.5 | | 112 | 109 |

Notes A and B.—See Example 1.
Note D.—See Example 4.

The 50:50 blends of this example have an average R scale hardness of 109 which forms the final point on the straight line hardness versus composition plot covering blends containing from 0% to 50% resin B.

The average tensile strength of the 50:50 blends of this example is 6960 pounds per square inch. As mentioned previously, a composition versus tensile strength plot shows that the tensile strength of the blends of this invention increases at a rate somewhat faster than would result were the composition versus tensile strength relationship a straight line function.

The average heat distortion point of the 50:50 blends of this example is 109.4° C., practically identical to the average heat distortion point (109.6° C.) of the 60:40 resin Y-resin B blends of Example 4. Accordingly, when the resin B content of the blend is in the range 10–20% the heat distortion point is constant and low (103–104° C.); when the resin B content is in the range 40–50% the heat distortion point is constant and high (109–110° C.). At a resin B content of 30%, the heat distortion point had a value (108° C.) just under the above mentioned constant and high value.

Example 6

The following table presents physical characteristics of an 80:20 resin X-resin B blend. As set forth previously (Example 1), resin X is obtained by the graft copolymerization of 29 parts acrylonitrile and 51 parts styrene onto 20 parts (dry basis) polybutadiene present in the form of an aqueous polybutadiene latex.

To facilitate comparisons, data are also presented on the physical caracteristics of 100% resin X and an 80:20 resin Y-resin B blend.

| Polymer resin designation | | 15 | 2 |
|---|---|---|---|
| Parts by weight resin X | 100 | 80 | |
| Parts by weight resin Y | | | 80 |
| Parts by weight resin B | | 20 | 20 |
| Notched Izod Impact Value, ⅛ in. bar; Ft.lbs./inch of notch (A.S.T.M Method D-256) | 3.5 | 3.8 | 6.8 |
| Rockwell Hardness, R Scale (A.S.T.M. Method D-785) | 100 | 105 | 97 |
| Tensile Strength, Lbs./Sq.in. (A.S.T.M. Method D-636) | 5,645 | 6,225 | 5,450 |
| Elongation, percent | 20 | 40 | 50 |
| Melt Index A1 (Note A) | 2.2 | 1.2 | 0.8 |
| Heat Distortion Point, °C. (Note B) | 98 | 106 | 104 |

Notes A and B.—See Example 1.

It is seen that the 80:20 resin X-resin blend, in comparison with a resin Y-resin B blend of the same composition, is characterized by a lower but still satisfactorily high impact value and a higher hardness, tensile strength and heat distortion point. As set forth previously in connection with blends containing resin Y, as resin X-resin B blends of increasing resin B content are produced the hardness of the blends increases as a straight line function of the resin B content while the tensile strength increases a little faster than a straight line function of the resin B content.

On the other hand, and as previously observed with blends containing resin Y, resin X-resin B blends having a ratio of around 60:40 show a greatly increased heat distortion point over that of the 80:20 blend but further increases in this characteristic are not observed as blends of higher resin B content are produced.

If desired, blends prepared in accordance with this invention may contain additional components, such as pigments, fillers, plasticizers, and the like, frequently incorporated into resins and resin blends in accordance with conventional practices of the art.

While this invention has been described in connection with graft copolymer blending components formed by the interaction, under polymerizing conditions, of a mixture of styrene and acrylonitrile and polybutadiene latex, the invention is not limited to this particular combination of reactants.

The polybutadiene latex may be replaced, in part or entirely, by other conjugated diolefine polymer latices. In the preparation of such other latices the butadiene component may be replaced, in part or entirely, by such conjugated diolefines as isoprene, pentadiene-1,3, the methyl 1,3-pentadienes, dimethyl butadiene-1,3, the 1,3 and 2,4-hexadienes and the like, including mixtures of two or more such conjugated diolefines (including butadiene-1,3).

Likewise, in the preparation of the graft copolymer blending components of this invention, the styrene may be replaced, in part or entirely, by such hydrocarbons as alpha methyl styrene, vinyl toluenes, alpha methyl vinyl toluenes and the like, including mixtures of two or more such hydrocarbons (including styrene).

Also, if desired, in the preparation of graft copolymer blending components of this invention the acrylonitrile may be replaced, in part or entirely, with methacrylonitrile, ethacrylonitrile and the like, including mixtures of two or more such compounds (including acrylonitrile).

The general fields of utility of the resin blends of this invention are self evident. However, as will be obvious from the physical characteristics of the blends of this invention, they find their greatest field of usefulness in the fabrication of shaped articles, particularly rigid shaped articles that are subjected to stresses during assembly and that may subsequently be subjected to vibration, shock, impact loads, elevated temperatures and the like during use. The blends of this invention are particularly adapted to the fabrication of calendered rigid sheets, moldings, pipe, pipe fittings, valves, valve parts, and similar objects. The unusual properties of these blends permit their use in the fabrication of rigid shaped articles exhibiting one or more sharp directional transitions in the design thereof. Rigid shaped articles made from these blends may be threaded, drilled, tapped, etc., if desired. Due to the high chemical resistance of these blends and their good resistance to deterioration under the influences of various atmospheric agencies, rigid shaped articles made therefrom are ideally suited for use as component parts of chemical and related plants and for use under conditions where a high environmental stability is required. Plastic pipe made from the blends of this invention, particularly from those varieties characterized by a high heat distortion point, are eminently suited for use in the transport of corrosive fluids at elevated pressures and temperatures.

Be it remembered, that while this invention has been described in connection with specific details and examples thereof, these details and examples are illustrative only and are not to be considered limitations on the spirit or scope of said invention except insofar as these may be incorporated in the appended claims.

I claim:

1. A mechanical blend consisting of about 50% to about 70% by weight of (A) a graft copolymer of 20% to 60% by weight of a synthetic aliphatic conjugated diolefine hydrocarbon polymer, 30% to 70% by weight of a material selected from the group consisting of styrene, alpha methyl styrene, vinyl toluenes and alpha methyl vinyl toluenes, and 10% to 30% by weight of a material selected from the group consisting of acrylonitrile, methacrylonitrile and ethacrylonitrile and, correspondingly, from about 50% to about 30% by weight of (B) an interpolymer of 20% to 30% by weight acrylonitrile, 80% to 60% by weight alpha methyl styrene and 0% to 10% by weight styrene.

2. A mechanical blend consisting of about 50% to about 70% by weight of (A) a graft copolymer of 20% to 60% by weight of a synthetic aliphatic conjugated diolefine hydrocarbon polymer, 30% to 70% by weight of a material selected from the group consisting of styrene, alpha methyl styrene, vinyl toluenes and alpha methyl vinyl toluenes, and 10% to 30% by weight of a material selected from the group consisting of acrylonitrile, methacrylonitrile and ethacrylonitrile and, correspondingly, from about 50% to about 30% by weight of (B) an interpolymer of 20% to 30% by weight acrylonitrile and 80% to 70% by weight alpha methyl styrene.

3. A mechanical blend consisting of about 50% to about 70% by weight of (A) a graft copolymer of 20% to 60% by weight of a synthetic aliphatic conjugated diolefine hydrocarbon polymer, 30% to 70% by weight of a material selected from the group consisting of styrene, alpha methyl styrene, vinyl toluenes and alpha methyl vinyl toluenes, and 10% to 30% by weight of a material selected from the group consisting of acrylonitrile, methacrylonitrile and ethacrylonitrile and, correspondingly, from about 50% to about 30% by weight of (B) an interpolymer of 20% to 30% by weight acrylonitrile, 75% to 60% by weight alpha methyl styrene and 5% to 10% by weight styrene.

4. A mechanical blend consisting of about 50% to about 70% by weight of (A) a graft copolymer of 20% to 60% by weight of polybutadiene, 30% to 70% by weight styrene and 10% to 30% by weight acrylonitrile and, correspondingly, from about 50% to about 30% by weight of (B) an interpolymer of 20% to 30% by weight acrylonitrile, 80% to 60% by weight alpha methyl styrene and 0% to 10% by weight styrene.

5. A mechanical blend consisting of about 50% to about 70% by weight of (A) a graft copolymer of 20% to 60% by weight of polybutadiene, 30% to 70% by weight styrene and 10% to 30% by weight acrylonitrile and, correspondingly, from about 50% to about 30% by weight of (B) an interpolymer of 20% to 30% by weight acrylonitrile and 80% to 70% by weight alpha methyl styrene.

6. A mechanical blend consisting of about 50% to about 70% by weight of (A) a graft copolymer of 20% to 60% by weight of polybutadiene, 30% to 70% by weight styrene and 10% to 30% by weight acrylonitrile and, correspondingly, from about 50% to about 30% by weight of (B) an interpolymer of 20% to 30% by weight acrylonitrile, 75% to 60% by weight alpha methyl styrene and 5% to 10% by weight styrene.

References Cited in the file of this patent

UNITED STATES PATENTS

| | | |
|---|---|---|
| 2,700,185 | Lee | Jan. 25, 1955 |
| 2,802,808 | Hayes | Aug. 13, 1957 |
| 2,802,809 | Hayes | Aug. 13, 1957 |
| 2,820,773 | Childers et al. | Jan. 21, 1958 |
| 2,841,569 | Rugg et al. | July 1, 1958 |
| 2,908,661 | Calvert | Oct. 13, 1959 |

FOREIGN PATENTS

| | | |
|---|---|---|
| 778,265 | Great Britain | July 3, 1957 |
| 529,621 | Canada | Aug. 28, 1955 |

OTHER REFERENCES

Boundy et al.: "Styrene," page 701, published by Reinhold Pub. Corp., New York.

Billmeyer: "Textbook of Polymer Chemistry," pages 239–240, published by Interscience Pub. Inc., New York (1957).

Hart: "Industrie Chimique Belge," 21, 1051 (page 1057 relied upon) (1956).